United States Patent
> Marlowe et al.

[15] 3,651,329
[45] Mar. 21, 1972

[54] AUTOMOTIVE ANTI-THEFT SYSTEM

[72] Inventors: Philip Marlowe, 20744 Camden Square, Apt. 104, Southfield; Joel Greenberg, 18045 Strathmoor, Detroit, both of Mich. 48235

[22] Filed: Jan. 20, 1970

[21] Appl. No.: 4,316

[52] U.S. Cl.............................307/10 AT, 180/114, 70/255
[51] Int. Cl.........................................................H02g 3/00
[58] Field of Search....................307/10 R, 10 AT; 180/114; 70/422, 255, 1.5; 200/44

[56] References Cited

UNITED STATES PATENTS 3,340,370  9/1967  Sideleau..................................200/44
3,160,761  12/1964  Fuller..............................307/10 AT Primary Examiner—Herman J. Hohauser
Attorney—Harness, Dickey & Pierce

[57] ABSTRACT

An anti-theft device for automotive vehicles that precludes operation of the ignition circuit if the ignition switch is tampered with. Two embodiments are disclosed that may be combined in a single system. In one embodiment, a micro-switch is placed in the ignition circuit and is connected to the lock by means of a frangible element. If the lock is removed the frangible element breaks and opens the switch thus disabling the circuit. In the second embodiment, an anti-theft lock is provided that operates on the structure that interconnects the lock to the ignition switch and engages upon removal of the lock to preclude operation of the ignition switch.

9 Claims, 4 Drawing Figures

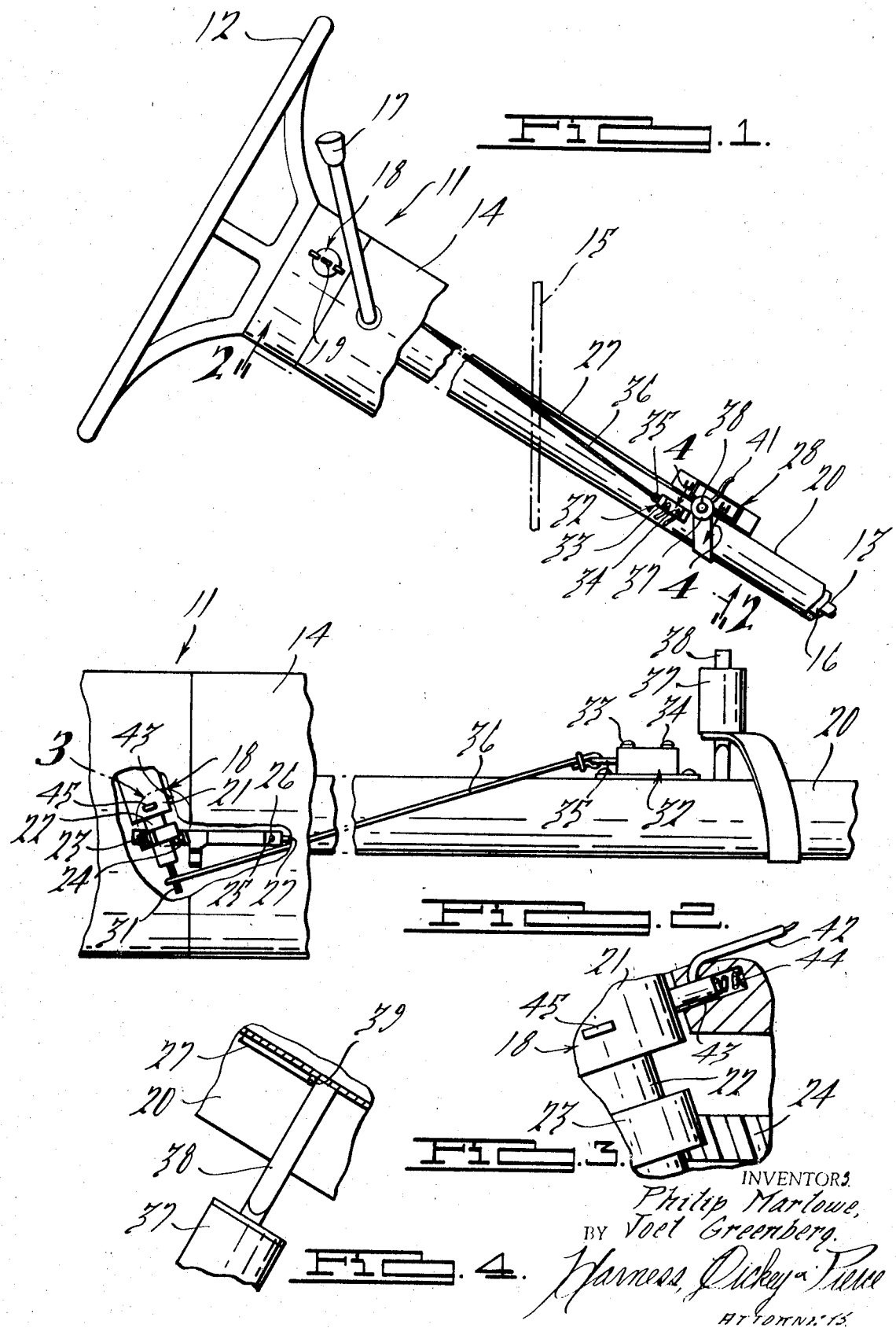

AUTOMOTIVE ANTI-THEFT SYSTEM

BACKGROUND OF THE INVENTION

This invention relates to an automotive anti-theft device and more particularly to a device for precluding antitheft of a motor vehicle ignition circuit if the key operated switch of the ignition circuit is tampered with.

Recently, and in response to an increasing number of car thefts, various devices have been proposed for preventing the unauthorized use of motor vehicles. Of the various types of such antitheft devices that have been proposed, one of the most common is the coincidental lock that precludes operation of the steering mechanism as well as locking the ignition switch. With such coincidental locks, the ignition switch is remotely located from the key operated lock and a linkage arrangement interconnects these two elements. Rather than making the vehicle more difficult to steal, such devices actually facilitate theft. When the key operated lock is removed, the linkage system for the ignition switch is readily accessible and may be easily manipulated. Thus, the necessity of jumping or hot wiring the ignition circuit is eliminated with such devices.

It is therefore a principal object of this invention to provide an improved automotive antitheft device.

It is another object of the invention to provide a device for precluding operation of the ignition switch when the key operated lock is forced.

It is a further object of the invention to provide a device for disabling the ignition circuit when the key operated lock is forced.

SUMMARY OF THE INVENTION

This invention is adapted to be embodied in a motor vehicle having an ignition circuit and a key controlled lock for the ignition circuit. The invention comprises the interpositioning of a switch in the ignition circuit and providing means for opening the switch when the lock is forced for precluding unauthorized operation of the vehicle.

Another feature of the invention is adapted to be embodied in a motor vehicle having a ignition circuit including a key controlled lock, an ignition switch and means interconnecting the key controlled lock and the ignition switch. In connection with this feature, theft preventing means are providing for disabling the interconnection between the lock and the ignition switch in response to forcing of the lock.

BRIEF DESCRIPTION OF THE DRAWINGS

FIG. 1 is a side elevational view, with portions broken away, of a vehicular steering column embodying this invention.

FIG. 2 is a plan view taken generally along the line 2—2 of FIG. 1.

FIG. 3 is an enlarged view of the area encompassed by the circle in FIG. 2.

FIG. 4 is an enlarged cross-sectional view taken along the line 4—4 of FIG. 1.

DETAILED DESCRIPTION OF THE PREFERRED EMBODIMENTS

Two embodiments of the invention are disclosed and will be described in detail. Each of these embodiments may be combined in a single antitheft system. Alternatively, either of the of the embodiments may be used independently of the other.

Referring specifically to the figures, a steering column assembly for a motor vehicle is identified generally by the reference numeral 11. The steering column assembly 11 includes a steering wheel 12 that is connected in any known manner to a steering shaft 13. A protective mast 14 encircles the steering shaft 13 and extends from a position adjacent the steering wheel 12 through a firewall 15 to a point adjacent the steering gear box (not shown). A transmission selector tube 16 encircles the steering shaft 13 and is disposed concentrically within the mast 14. A transmission selector lever 17 is fixed in any known manner to the selector tube 16 for rotating this tube. A tube 20 encircles and protects the tube 16 and enclosed steering shaft 13.

A key controlled lock indicated generally by the reference numeral 18 is supported on the mast 14 adjacent the steering wheel 12. The lock 18 has a key receiving opening 19 and a tumbler mechanism 21 of any known type. When the proper key is inserted within the aperture 19 and is rotated, a shaft 22 will also be rotated. The shaft 22 is formed with an integral pinion gear 23 that is enmeshed with a rack 24. The rack 24 is slidably supported within the mast 14 and is formed with an aperture 25. An offset arm 26 of an ignition switch operating rod 27 is received in the opening 25. Rotation of the shaft 22 and pinion gear 23 will cause reciprocation of the rack 24 and the ignition switch operating rod 27.

The opposite end of the ignition switch operating rod 27 is connected in any known manner to an ignition switch, indicated generally by the reference numeral 28. The ignition switch 28 is movable between a plurality of positions in which different electrical circuits are established. For example, as is conventional in present motor vehicle practice, the ignition switch 28 may have an off position, an accessory operating position, an on position and a start position. The functions of each of these positions are well known and will not be described again in detail. In this embodiment, as the operating element of the ignition switch 28 is moved from one extreme position to another, it moves through these positions in the following order: accessory, off, on and start.

A sector gear 31 may be affixed for rotation with the shaft 22 (FIGS. 2 and 3) to operate a coincidental steering column and/or transmission selector lock (not shown). This much of the structure is conventional in present motor vehicles. It should be readily apparent that forcible removal of the ignition switch 18 will expose either the rack 24 and/or the ignition switch operating rod 27. When the ignition switch 18 is removed, the coincidental locking mechanism will also be disabled due to the removal of the sector gear 31. A thief can easily steal the associated motor vehicle by removing the ignition switch assembly 18 and manipulating the rack 24 and/or ignition switch operating rod 27 by a simple tool. The embodiments now to be described make this unauthorized operation impossible.

A micro switch, indicated generally by the reference numeral 32, is supported within the mast 14 adjacent its lower end. The switch 32 has a pair of terminals 33 and 34 that are in circuit with the ignition circuit of the motor vehicle and are in circuit with the ignition switch 28. An actuating element 35 opens and closes the microswitch 32 and makes or breaks the electrical connection between the terminals 33 and 34.

The switch actuating element 35 is connected by a frangible wire or connector 36 to any suitable portion of the tumbler mechanism 21. The switch 32 is normally spring biased to an open position and the tensioning of the cable 36 holds the switch 32 closed.

A solenoid 37 is supported within the mast 14 and is juxtaposed to the ignition switch 28. The solenoid 37 operates a plunger 38 which plunger is adapted to cooperate with an opening 39 formed in the ignition switch operating rod 27 adjacent the switch 28. The plunger 38 is normally biased to a position in which it is received in the opening 39. When so received in the opening 39, the ignition switch operating rod 27 and ignition switch 28 may only be removed between the off and accessory positions.

A hot lead 41 is connected to the solenoid 37 to supply power to the solenoid 37 and moves the plunger 38 to a released position when the other side of the solenoid is grounded. In the released position of the plunger 38, the ignition switch operating rod 27 and ignition switch 28 may be operated in a conventional manner. A conduit 42 extends from the opposite ends of the turning of the solenoid 37 to a plunger 43 that is juxtaposed to the tumbler 21. A coil spring 44 normally urges the plunger 43 into engagement with the tumbler 21. A ground contact 45 is positioned on the tumbler 21 and is brought into registry with the plunger 43 when the key operated lock is rotated approximately 15° toward its on position. At this time, the circuit for the solenoid 37 will be complete and the plunger 38 will be withdrawn making operation of the ignition switch 28 possible.

The conventional operation of the ignition switch 28 has already been described as has the possible modes of operation in the event the key operated lock 18 is forced, particularly if it is forcible removed. With the disclosed structure, however, operation of the vehicle under these circumstances is precluded. If the tumbler 21 is forcibly removed the frangible element 36 will be severed. When this occurs the spring operating on the element 35 will cause the microswitch 32 to be open thus breaking the ignition circuit. At the same time the frangible element 36 will be pulled into the mast 14 and will be inaccessible to the thief. Thus, this portion of the antitheft device will, itself, preclude unauthorized use of the vehicle.

When the tumbler 21 is removed, the spring 44 will force the plunger 43 from within its supporting aperture. Since the plunger 38 associated with the solenoid 37 engages the ignition switch operating rod 27, the ignition switch 28 also cannot be operated. Because the plunger 43 will also fall down the mast 14 upon disengagement it will be impossible to short circuit the solenoid 38 so as to release it. Thus, this portion of the antitheft device will also preclude unauthorized use of the vehicle. It should be readily apparent that either of the antitheft devices can be used alone as has been already noted.

What is claimed is:

1. In a motor vehicle having an ignition circuit and a key controlled lock for the ignition circuit, the improvement comprising: a switch interposed in said ignition circuit and means responsive to forcing of said key controlled lock for opening said switch when said key controlled lock is forced for precluding unauthorized operation of the vehicle.

2. A motor vehicle set forth in claim 1 further including means for enclosing the switch for precluding tampering therewith.

3. A motor vehicle set forth in claim 1 further including a steering column having a protective mast, the key controlled lock being carried by the mast and the switch being supported within the mast contiguous to its lower end.

4. A motor vehicle as set forth in claim 1 wherein the switch is normally opened and the means for opening the switch comprises a frangible element interconnected between the key controlled lock and the switch for holding the switch in a closed position until the key controlled lock is forcibly removed and the frangible element breaks.

5. A motor vehicle as set forth in claim 1 further including an ignition switch for the ignition circuit, said ignition switch being remotely positioned from the key controlled lock and operatively connected thereto by linkage means.

6. The motor vehicle set forth in claim 5 wherein the switch is normally opened and the means for opening the switch comprises a frangible element interconnected between the key controlled lock and the switch for holding the switch in a closed position until the key controlled lock is forcibly removed and the frangible element breaks.

7. In a motor vehicle having an ignition circuit including a key controlled lock, an ignition switch and means interconnecting said key controlled lock and said ignition switch for operating said ignition switch upon operation of said key controlled lock, the improvement comprising theft preventing means for disabling said interconnecting means in response to forcing of said key controlled lock for precluding unauthorized operation of the vehicle.

8. A motor vehicle as set forth in claim 7 wherein the interconnecting means comprises linkage means, the theft preventing means comprising locking means for precluding operation of the linkage means in response to forcing of the key controlled lock.

9. A motor vehicle as set forth in claim 8 wherein the locking means comprises a spring biased plunger and a solenoid for releasing said plunger, said solenoid being in circuit with an element adapted to contact the lock for sensing the presence of the lock and for breaking the circuit to said solenoid when said lock is removed.

* * * * *